United States Patent
Goldschmidt

(10) Patent No.: US 11,315,116 B2
(45) Date of Patent: Apr. 26, 2022

(54) SYSTEMS AND METHODS FOR USE IN AUTHENTICATING CONSUMERS IN CONNECTION WITH PAYMENT ACCOUNT TRANSACTIONS

(71) Applicant: MASTERCARD INTERNATIONAL INCORPORATED, Purchase, NY (US)

(72) Inventor: David Goldschmidt, Aventura, FL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 878 days.

(21) Appl. No.: 15/381,695

(22) Filed: Dec. 16, 2016

(65) Prior Publication Data

US 2018/0174149 A1 Jun. 21, 2018

(51) Int. Cl.

| | |
|---|---|
| G06Q 20/40 | (2012.01) |
| G06Q 20/20 | (2012.01) |
| G06K 9/00 | (2022.01) |
| G06Q 20/34 | (2012.01) |
| G07F 7/10 | (2006.01) |

(52) U.S. Cl.
CPC ... *G06Q 20/40145* (2013.01); *G06K 9/00161* (2013.01); *G06K 9/00268* (2013.01); *G06K 9/00288* (2013.01); *G06Q 20/202* (2013.01); *G06Q 20/341* (2013.01); *G06Q 20/409* (2013.01); *G06Q 20/4012* (2013.01); *G07F 7/1008* (2013.01); *G06Q 2220/00* (2013.01)

(58) Field of Classification Search
None
See application file for complete search history.

(56) References Cited

U.S. PATENT DOCUMENTS

| 7,314,164 B2 | 1/2008 | Bonalle et al. |
| 10,142,333 B1 * | 11/2018 | Griffin ............... H04L 63/0861 |
| 2009/0106134 A1 * | 4/2009 | Royyuru ............... G06Q 40/00 |
| | | 705/35 |

(Continued)

OTHER PUBLICATIONS

"Facial Recognition with Biometric Encryption in Match-on-Card Architecture for Gaming and Other Computer Applications"; www.privacybydesign.ca; Jun. 30, 2014; 22 pgs.

*Primary Examiner* — Jamie R Kucab
(74) *Attorney, Agent, or Firm* — Harness, Dickey & Pierce, P.L.C.

(57) ABSTRACT

Systems and methods are provided for use in authenticating consumers based on images of the consumers stored in payment cards. One exemplary method includes receiving, at a point-of-sale (POS) device, a transaction request by a consumer to purchase a product and soliciting, by the POS device, a payment device from the consumer for funding the transaction request. The method also includes retrieving, by the POS device, a reference image provisioned to the payment device, capturing, by the POS device, an image of the consumer presenting the payment device, and comparing, by the POS device, the captured image of the consumer to the reference image. The method then further includes submitting an authorization request, in response to the transaction request, when the captured image of the consumer matches the reference image, whereby the consumer is authenticated to the payment device.

14 Claims, 5 Drawing Sheets

(56) References Cited

U.S. PATENT DOCUMENTS

| | | | |
|---|---|---|---|
| 2010/0097180 A1* | 4/2010 | Cardullo | G07F 7/1008 340/5.83 |
| 2010/0135542 A1* | 6/2010 | Keepper, Jr. | G06K 9/036 382/124 |
| 2010/0277278 A1 | 11/2010 | Courouble et al. | |
| 2013/0226792 A1 | 8/2013 | Kushevsky et al. | |
| 2015/0161580 A1 | 6/2015 | Seol | |
| 2015/0206136 A1 | 7/2015 | Maddocks et al. | |
| 2016/0042346 A1* | 2/2016 | Pastore | G06Q 20/40145 705/44 |
| 2016/0071101 A1* | 3/2016 | Winarski | G06Q 20/3829 705/71 |
| 2016/0098705 A1* | 4/2016 | Kurapati | G06Q 20/40145 705/41 |
| 2016/0253651 A1* | 9/2016 | Park | G06Q 20/34 705/39 |
| 2017/0262854 A1* | 9/2017 | Donovan | G06Q 20/40145 |

* cited by examiner

SYSTEMS AND METHODS FOR USE IN AUTHENTICATING CONSUMERS IN CONNECTION WITH PAYMENT ACCOUNT TRANSACTIONS

FIELD

The present disclosure generally relates to systems and methods for use in authenticating consumers in connection with payment account transactions, and in particular, to systems and methods for use in authenticating the consumers when the payment account transactions are initiated, based on biometric data indicative of the consumers and stored in payment cards used for the payment account transactions.

BACKGROUND

This section provides background information related to the present disclosure which is not necessarily prior art.

Consumers often use payment accounts to fund purchase transactions for products from merchants (e.g., for goods and services, etc.). To fund the purchase transactions, the consumers often use payment accounts, whereby the consumers present payment cards associated with the payment accounts to the merchants. The payment cards are known to include various credentials for the consumers' payment accounts, necessary to facilitate the transactions, such as, for example, primary account numbers (PANs), expiration dates, card verification value (CVV) codes, and also names associated with the consumers authorized to use the payment cards (and by extension the corresponding payment accounts). In connection therewith, the consumers may be authenticated to the payment accounts by providing signatures to the merchants matching signatures on the payment cards, or by entering personal identification numbers (PINs). It is also known for merchants to accept fingerprints to authenticate the consumers in connection with such payment account transactions.

DRAWINGS

The drawings described herein are for illustrative purposes only of selected embodiments and not all possible implementations, and are not intended to limit the scope of the present disclosure.

Figure 1:
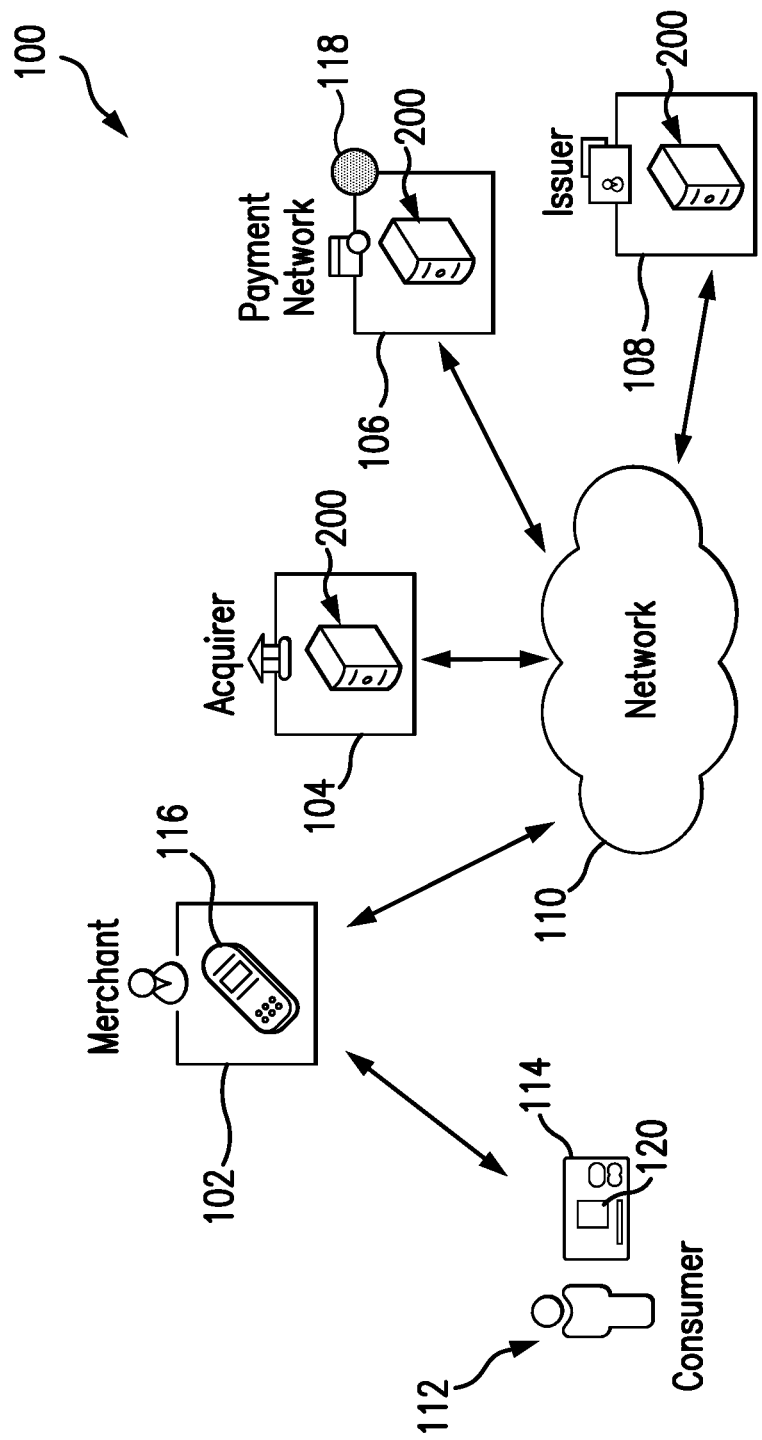
Figure 2:
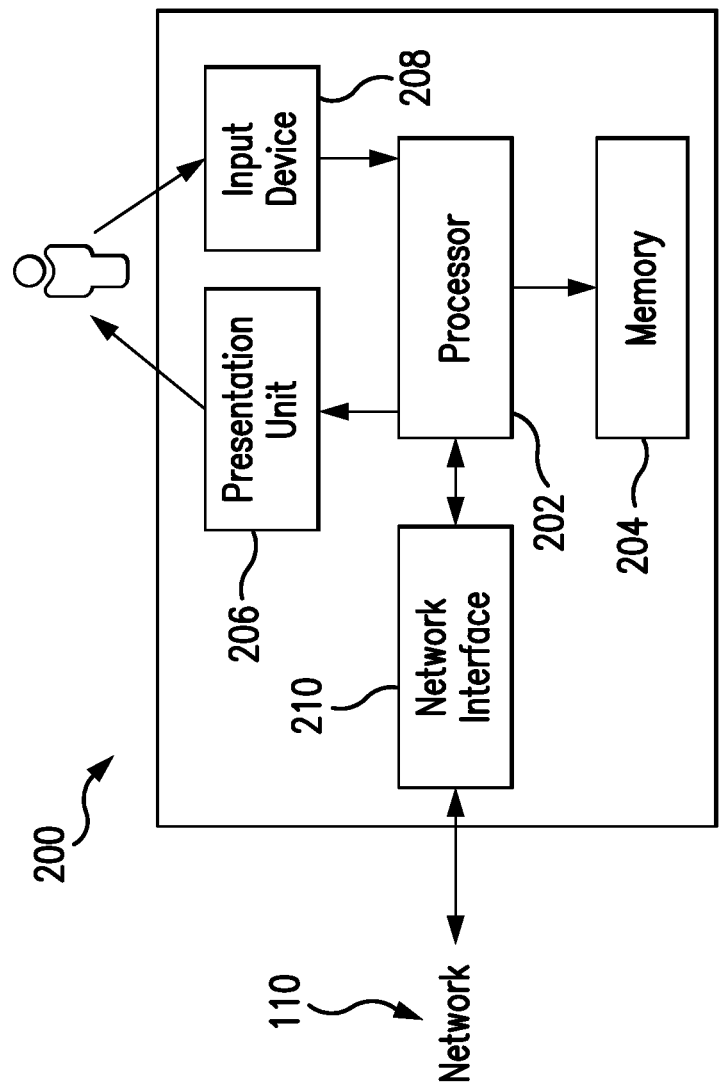
Figure 3:
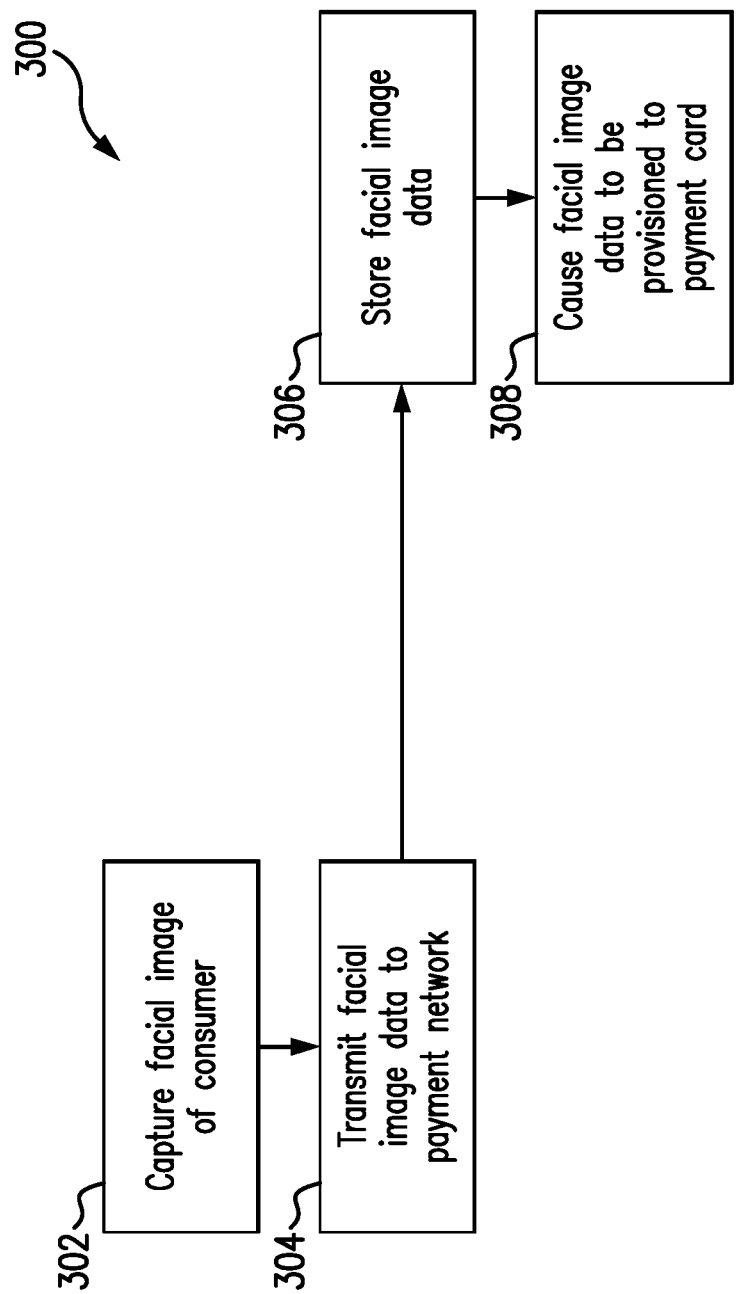
Figure 4:
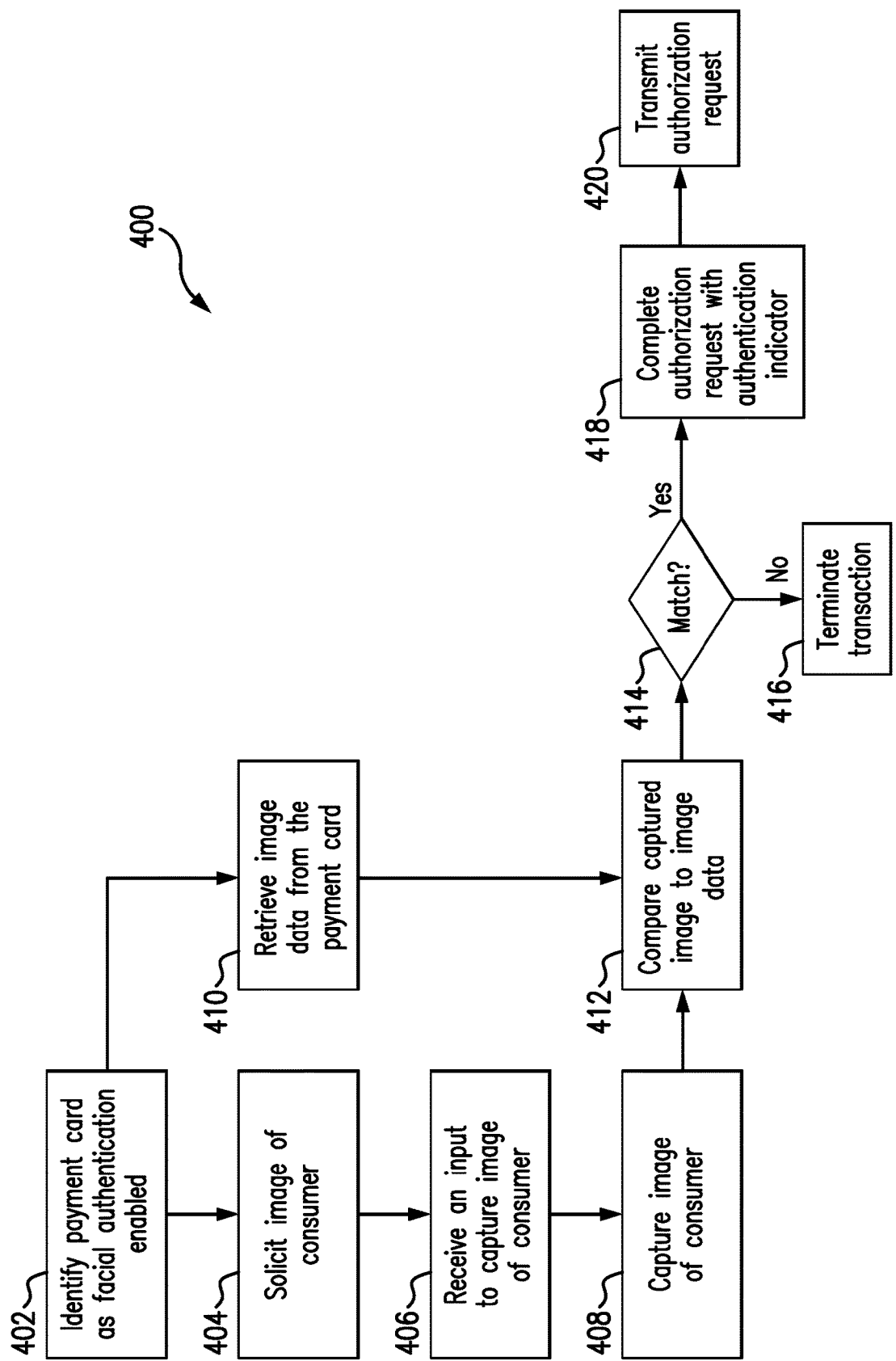
Figure 5:
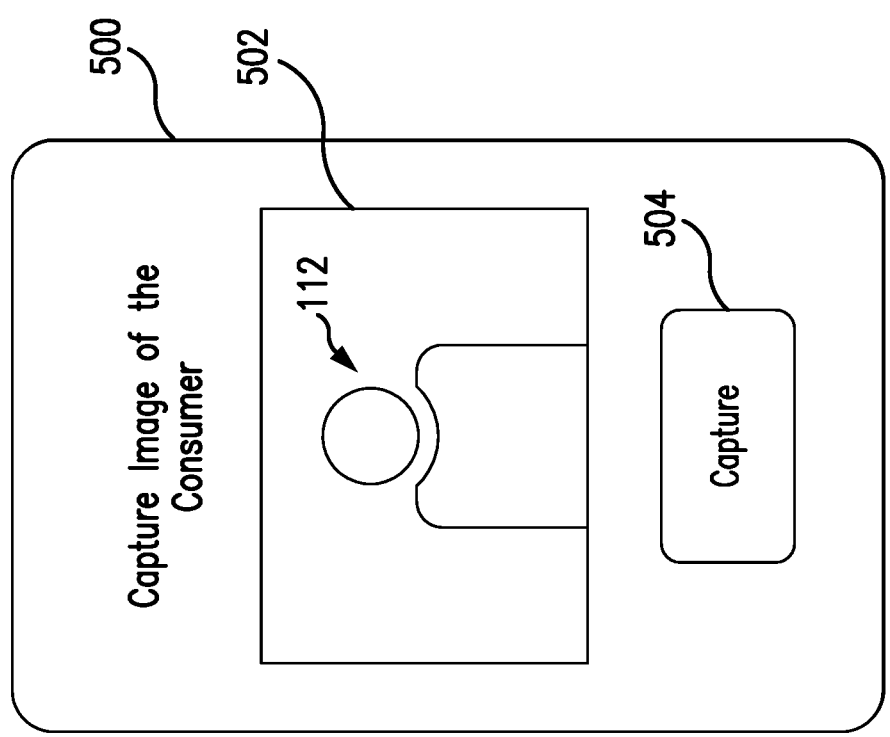

FIG. 1 is a block diagram of an exemplary system of the present disclosure suitable for use in authenticating consumers in connection with payment account transactions by the consumers, based on facial image data stored in payment cards used in the transactions;

FIG. 2 is a block diagram of a computing device that may be used in the exemplary system of FIG. 1; and FIG. 3 is an exemplary method that may be implemented in the system of FIG. 1 for use in capturing and storing facial image data for a consumer at a payment network, so that the facial image data may be used to authenticate the consumer in connection with a payment account transaction by the consumer;

FIG. 4 is an exemplary method that may be implemented in the system of FIG. 1 for use in authenticating a consumer to a payment account based on image data stored in a payment card associated with the payment account and used in a payment account transaction by the consumer; and FIG. 5 is an exemplary interface that may be used in the system of FIG. 1 and/or the method of FIG. 4 to capture facial image data from a consumer, at a point-of-sale (POS) device, for use in authenticating the consumer to a payment account in connection with a payment account transaction by the consumer, at a merchant, when using the payment account.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment accounts are often used by consumers to fund purchase transactions for products at merchants (e.g., for goods and/or services, etc.). Typically, the consumers authenticate themselves to the payment accounts when initiating such purchase transactions by, for example, presenting identification to the merchants, providing reference signatures, or entering personal identification numbers (PINs), etc. Uniquely, the systems and methods herein allow consumers to authenticate themselves to their payment accounts through use of biometric data (e.g., image data, fingerprint data, voice data, retina data, heart-rate data, other known biometric data, etc.) locally stored at payment devices associated with the payment accounts and used in the purchase transactions. In particular, for example, the biometric data may include image data stored in payment cards associated with the payment accounts, whereby the consumers may be authenticated to their payment accounts at point-of-sale (POS) devices (e.g., POS terminals, mobile POS devices, other POS devices, etc.) used to facilitate the transactions, based on the image data. In this example, a consumer may initially capture a reference image of his/her face, including, for example, a selfie image captured by the consumer using his/her communication device. The image is then provided to a payment network, which stores the image in association with the consumer's payment account. In turn, the image is provisioned by the payment network to a payment card associated with the consumer's payment account (and the payment card is provided to the consumer). Then, in connection with performing a purchase transaction at a merchant using the payment account, the consumer is able to present the payment card to the merchant (for use by the merchant in identifying the consumer's payment account), whereupon an image of the consumer is captured by a POS device and compared to the reference image data stored in the payment card. In this manner, the consumer is able to be immediately and locally authenticated to his/her payment account, without need for network connectivity, based on the image of the consumer captured by the POS device and the corresponding comparison of the captured image to the reference image data stored in the payment card.

FIG. 1 illustrates an exemplary system 100, in which the one or more aspects of the present disclosure may be implemented. Although the system 100 is presented in one arrangement, other embodiments may include systems arranged otherwise depending, for example, on manners of processing purchase transactions to payment accounts, use of biometrics (and the particular biometrics used) in authenticating consumers in connection with purchase transactions, etc.

With that said, the illustrated system 100 generally includes a merchant 102, an acquirer 104 associated with the merchant 102, a payment network 106, and an issuer 108 of payment accounts, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, the network 110 may include multiple different networks, such as a private payment transaction network made accessible by the payment network 106 to the acquirer 104 and the issuer 108 and, separately, the public Internet, which is accessible as desired to the merchant 102, the acquirer 104, the issuer 108, and/or consumer 112.

The merchant 102 is generally associated with products (e.g., goods and/or services, etc.) provided for sale to consumers, including the consumer 112. In connection therewith, the consumer 112 is associated with a payment account, which may be used to fund purchase transactions for the products from the merchant 102 (as payment account transactions). The payment account is issued to the consumer 112 by the issuer 108 and, in this embodiment, is a credit payment account. The credit payment account permits the consumer 112 to purchase the products from the merchant 102 using credit from the issuer 108, such that the issuer 108 actually funds the purchase transactions. Payment from the consumer 112 to the issuer 108, in response to the credit, then often occurs at a later time. It should be appreciated that the consumer 112 may be associated with other types of payment accounts within the scope of the present disclosure including, for example, debit payment accounts, prepaid payment accounts, etc.

In this exemplary embodiment, the consumer 112 includes a payment card 114 (broadly, a payment device) associated with his/her payment account (regardless of the type of the payment account). As such, in the illustrated embodiment, in connection with a purchase transaction for a product (or for multiple products) at the merchant 102, the consumer 112 presents the payment card 114 to a point-of-sale (POS) device 116 at the merchant 102. In turn, the POS device 116 reads payment credentials for the consumer's payment account from the payment card 114 (in order to secure funds for the transaction and/or provide a receipt). This will be described in more detail hereinafter. The payment card 114 is generally a card device, which may include limited electronic components such, as for example, an EMV chip, etc., suitable to communicate with the POS device 116, and also memory (e.g., as part of the EMV chip, or separate therefrom yet in communication therewith, etc.) to store biometric data related to the consumer 112 (as described in more detail below.) In this embodiment, the payment card 114, however, is not a smartphone, tablet, etc., and generally is not capable of communicating with the network 110. However, it should still be appreciated that other payment devices, other than card devices, may be used in the system 100 in other embodiments (e.g., FOB devices, communication devices (e.g., smartphones, etc.) that have Near Field Communications (NFC) capabilities and the ability to store payment credentials, etc.).

While only one merchant 102, one acquirer 104, one payment network 106, one issuer 108, one consumer 112, one payment card 114, and one POS device 116 are shown in the system 100 in FIG. 1, it should be appreciated that a different number of each may be included in other systems in other embodiments, consistent with the present disclosure.

FIG. 2 illustrates an exemplary computing device 200 that can be used in the system 100. The computing device 200 may include, for example, one or more servers, workstations, personal computers, laptops, tablets, smartphones, PDAs, POS devices, etc. In addition, the computing device 200 may include a single computing device, or it may include multiple computing devices located in close proximity or distributed over a geographic region, so long as the computing devices are specifically configured to function as described herein.

In the system 100 of FIG. 1, each of the acquirer 104, the payment network 106, and the issuer 108 are illustrated as including, or being implemented in, a computing device 200, coupled to (and in communication with) the network 110. In addition, the payment card 114 associated with the consumer 112 and the POS device 116 of the merchant 102 may also be consistent with the computing device 200. Further, the merchant 102 may include one or more other computing devices consistent with the computing device 200. The system 100, however, should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc. to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable storage media. The memory 204 may be configured to store, without limitation, transaction data, biometric data (e.g., captured images of consumers, reference image data for consumers (e.g., selfie images, etc.), etc.), and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the operations or processes described herein.

In the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information (e.g., requests to capture reference biometric data (e.g., reference image data, etc.) from consumers, indications of transactions being approved or declined, indications of biometric authentication being successful or not, etc.), either visually or audibly to a user of the computing device 200, for example, the consumer 112 in the system 100 (e.g., at the POS device 116, etc.), etc. Various interfaces (e.g., as defined by network-based applications, etc.) may be displayed at computing device 200, and in particular, at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) to, for example, capture biometric data (e.g., images, etc.) of/from the consumer 112, etc. The input device 208 is coupled to (and is in communication with) the processor 202 and may include, for example, a keyboard, a pointing device, a mouse, a stylus, a biometric reader (e.g., a camera, etc.), a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter (e.g., a WI-FI adapter, an NFC adapter, a Bluetooth® adapter, etc.), a mobile network adapter, or other device capable of communicating to/with one or more different networks, including the network 110. Further, the network interface 210, included in the POS device 116, for example, may be configured to interact with the payment card 114 to retrieve reference biometric data therefrom and/or otherwise to communicate therewith for enhanced authentication of the consumer 112, etc. And, despite the separate illustration, it should be appreciated that the processor 202 and one or more network interfaces 210 may be integrated in several embodiments.

Referring again to FIG. 1, the payment network 106 includes a biometric engine 118, which is configured to perform one or more operations herein. In particular, the biometric engine 118 is configured to receive reference biometric data (e.g., reference image data, etc.) from the consumer 112, to then store the reference biometric data at the payment network 106, and further to cooperate with the issuer 108 and/or the payment card 114 (and/or a third-party service provider associated therewith) to provision the biometric data to the payment card 114 (in connection with the consumer's associated payment account). With that said, while the following description of the system 100 is provided with reference to image biometric data, it should be appreciated that the present disclosure is not so limited and that other forms of available biometric data may be utilized herein in similar fashion (e.g., fingerprint data, retina data, voice data, heart rate data, etc.).

In so doing in the illustrated system 100, the consumer 112 interacts with the biometric engine 118 using a computing device (e.g., a communication device such as a smartphone, a tablet, etc. associated with the consumer 112 and consistent with the computing device 200, etc.) to provide the reference image data, for example, through an application programming interface (API), which is provided in connection with and/or available from the issuer 108. In particular, the API may be invoked through a web-based application (e.g., a website, etc.) associated with and/or offered by the issuer 108. Alternatively, or additionally, the consumer 112 may interact directly with the payment network 106, apart from the issuer 108, to provide reference image data (e.g., where a cryptogram of the reference image data is included in a data element of an authorization request (consistent with the ISO 8583 standard) for a transaction performed using the consumer's payment account, etc.).

As part of the interaction, the consumer 112 captures an image of himself/herself (e.g., a selfie image, etc.), or otherwise causes an image of himself/herself to be captured, and transmits the image (broadly, transmits image data associated with the captured image) to the biometric engine 118 (as a reference image of the consumer 112). The image of the consumer 112 may be captured using a communication device associated with the consumer 112, or the image may be captured using another input device 208 at the merchant 102 (e.g., via a camera input device at a computing device at the merchant 102, via a camera input device at an ATM at the merchant 102, etc.) or otherwise (e.g., via a public secured input device, etc.). In turn, the biometric engine 118 is configured to store the image data in a data structure (not shown) associated with the biometric engine 118 (and, in the illustrated system 100, associated with the payment network 106). In connection therewith, the payment network 106 may impose certain restrictions on the type of image data that may be received and stored. And, once stored, the issuer 108 and/or the consumer 112 may request the image data to be provisioned to the consumer's payment card 114. In response, the biometric engine 118 is configured to transmit the image data to the issuer 108, for example, or to a service provider (not shown) associated with at least one of the payment network 106, the issuer 108, and the payment card 114, so that the image data can be provisioned to the payment card 114 (and stored locally therein). In addition to the image data, payment account information for the consumer's payment account may also be provided by the biometric engine 118 (and/or retrieved from the payment network 106 and/or the issuer 108), including a primary account number (PAN) (e.g., a funding PAN, a device PAN, a token thereof, etc.), a card verification value (CVV) code (e.g., a dynamic CVV code as in EMV, a static CVV code, etc.), the consumer's name, an expiration date for the payment account, etc., for association with the payment card 114 (and, in some embodiments, for provisioning to the payment card 114, as appropriate).

In turn, by the issuer 108 or the service provider, the image data (and any desired payment account credential data) is provisioned to the payment card 114 (as represented at 120 in FIG. 1) and stored thereon (e.g., in memory 204 of the payment card 114, in association with an EMV chip of the payment card 114, etc.), and the payment card 114 is then delivered to the consumer 112 for use. It should be appreciated that the image data 120 may be provisioned to the payment card 114 at times other than prior to initial delivery of the payment card 114 to the consumer 112 (as just described). For example, the image data 120 may instead be provisioned to the payment card 114 at some later time, such as when the consumer 112 returns the payment card 114 to the issuer 108 (or to the service provider or to the payment network 106) so that facial authentication can be activated, or when the consumer 112 otherwise interacts therewith. As another example, the image data 120 may be provisioned to the payment card 114 at some later time at an ATM associated with the issuer 108 of the consumer's payment account (or at another ATM), where the ATM has the functionality to write to a chip at the payment card 114 (e.g., to store the image data in the memory 204 associated therewith, etc.). As still another example, the image data 120 may be provisioned to the payment card 114 at some later time via another computing device (e.g., a computing device associated with a representative of the issuer 108, such a banking branch of the issuer; etc.), where the other computing device, after capturing the image data, transmits the image data to the payment card 114 for storage thereon. As a further example, a payment device may be configured to directly capture image data of the consumer 112 and store the image data in memory 204 of the payment device (when the payment device has an input device 208, etc.). In these latter examples, the consumer 112 would not need to return the payment card 114 (or, more broadly, the payment device) to the issuer 108 (or to the service provider or to the payment network 106) in order to activate the facial authentication described herein. In any case, once the image data is provisioned to the consumer's payment card 114, the consumer 112 may use the payment card 114 to perform a purchase transaction at the merchant 102 for a product (or for multiple products).

In an example transaction at the merchant 102, the consumer 112 presents the payment card 114 to the merchant 102 in connection with purchasing a product from the merchant 102. In particular in this example, the consumer 112 provides the payment card 114 to the POS device 116 at the merchant 102 (e.g., by inserting the payment card 114 into the POS device 116, by tapping or waving the payment card 114 at the POS device 116 (e.g., using NFC to communicate, etc.), etc.), whereupon the POS device 116 is configured (via executable instructions) to initially identify the payment card 114 as facial authentication enabled and request that a merchant attendant (or associate) and/or the consumer 112 capture an image of the consumer 112 (e.g., generates an authentication request, etc.). For example, the POS device 116 may be configured to display an interface, which requests the image and provides a camera view section whereby the merchant attendant is able to point the POS device 116 (or part thereof) at the consumer 112 and adjust as needed to frame the consumer's face as part of capturing the image (e.g., as part of providing a capture command, etc.). Or, the consumer 112 may position himself/herself to frame his/her face in the camera view section, and then provide the necessary input to the POS device 116 to capture the image (e.g., independent of any merchant attendant, etc.). In turn, in either case, the POS device 116 is configured to capture the image of the face of the consumer 112. And, once captured, the POS device 116 is configured to retrieve the previously stored image data (e.g., the reference image for the consumer 112, etc.) from the payment card 114, and compare the captured image with the image data retrieved from the payment card 114 (e.g., via suitable algorithms such as principal components analysis (PCA), linear discriminant analysis (LDA), elastic bunch graph matching (EBGM), etc.; etc.). Alternatively, the merchant 102 (or merchant attendant) may utilize another computing device (other than the POS device 116) to capture an image of the consumer 112 in response to the request by the POS device 116 (e.g., when the POS device 116 does not including a camera input device, etc.). For example, in connection with a mobile POS device, the merchant 102 (or the merchant attendant) may use his/her communication device (as associated with the mobile POS device) to capture the image of the consumer 112 in connection with the transaction (in response to an application associated with the mobile POS device identifying the payment card 114 as facial authentication enabled and requesting that a merchant attendant (or associate) and/or the consumer 112 capture an image of the consumer 112).

When the image captured from the consumer 112 by the POS device 116 (or otherwise) matches the reference image data retrieved from the payment card 114, the POS device 116 understands the consumer 112 to be authenticated, whereupon the POS device 116 is configured to submit the purchase transaction for authorization. In so doing, the POS device 116 is configured to capture payment account credentials (if not already done) for the consumer's payment account (e.g., the PAN, the name of the consumer 112, the CVV code, the expiration date, etc.) from the payment card 114. The POS device 116 is configured to then compile an authorization request for the purchase transaction (including appending various transaction data for the purchase transaction thereto). In this example, the POS device 116 also generally includes an image authentication indicator in the authorization request, indicating that the consumer 112 has been authenticated. For example, the authorization request may include a message consistent with the ISO 8583 standard, such as a 0100 message (e.g., a request from the POS device 116 for authorization of the purchase transaction by the consumer 112 at the merchant 102, etc.), a 0200 message, or other suitable message. And, transaction data for the purchase transaction is then included in various data elements of the message, with the image authentication indicator also included in a data element in the message (e.g., a "2" for successful authentication, etc.). In addition, in various embodiments the POS device 116 may also include the image data for the consumer 112 in the message (e.g., in one or more data elements of the message, etc.).

Conversely, when the image captured from the consumer 112 by the POS device 116 does not match the reference image data retrieved from the payment card 114 (or when no image is captured from the consumer 112 by the POS device), the POS device 116 may understand the consumer 112 to not be authenticated, whereupon the POS device 116 may be configured to terminate the purchase transaction. Alternatively, the POS device 116 may be configured to request alternative forms of authentication from the consumer 112 (e.g., signature authentication, PIN authentication, etc.), for example, when the issuer 108 agrees to such alternative forms, etc. In other embodiments, however, when the image captured from the consumer 112 by the POS device 116 does not match the reference image data retrieved from the payment card 114 (or when no image is captured from the consumer 112 by the POS device), the POS device 116 may be configured to simply submit the purchase transaction for authorization without authentication. In these embodiments, and as described above, the POS device 116 is configured to then still capture payment account credentials (if not already done) for the consumer's payment account from the payment card 114, and compile an authorization request for the purchase transaction. In addition, the POS device 116 generally includes an image authentication indicator in the authorization request, as described above, indicating that the consumer 112 has not been authenticated (e.g., "1" for unsuccessful authentication, "0" no authentication attempt, "1-1" for unsuccessful authentication based on poor image quality, etc.).

Then in the system 100, after the authorization request is compiled, the merchant 102 (and particularly the POS device 116) communicates it to the acquirer 104, which in turn communicates the authorization request (or a form thereof) to the issuer 108 through the payment network 106 (e.g., through MasterCard®, VISA®, Discover®, American Express®, etc.) to determine whether the payment account is in good standing and whether there is sufficient credit or funds to complete the transaction. In this exemplary embodiment, the payment network 106 may intercept the authorization request to confirm the presence of the authentication indicator. If the authentication indicator is present and indicates that the consumer 112 has been authenticated, as in this example, the payment network 106 releases the authorization request to proceed to the issuer 108. Conversely, if the authentication indicator is absent, or if authentication was unsuccessful (as indicated by the authentication indicator present in the authorization request), or if no authentication attempt was made (as indicated by the authentication indicator included in the authorization request), the payment network 106 may halt the transaction and issue an authorization reply to the merchant 102, declining the transaction. Alternatively, the payment network 106 may still release the authorization request to proceed to the issuer 108, whereby the issuer makes a determination about approving or declining the transaction based, at least in part, on the authentication indicator.

Finally, if the issuer 108 accepts the transaction (and approves the corresponding authorization request), for authorization requests that are released to the issuer 108, a reply authorizing the transaction (e.g., in the form of an ISO 8583 message, etc.) is provided back to the acquirer 104 and the merchant 102, thereby permitting the merchant 102 to continue in the transaction. The transaction is later cleared and/or settled by and between the merchant 102 and the acquirer 104 (via an agreement between the merchant 102 and the acquirer 104) and by and between the acquirer 104 and the issuer 108 (via an agreement between the acquirer 104 and the issuer 108), via further communications. However, if the issuer 108 declines the transaction (and the corresponding authorization request), a reply declining the transaction is provided back to the merchant 102, thereby permitting the merchant 102 to halt the transaction.

As can be seen from the above example transaction (and the alternative embodiments described in connection therewith), the determination of whether to approve a transaction (and its underlying authorization request) may be done at the payment network 106 and/or at the issuer 108. Then, based on the approval or decline of the purchase transaction (regardless of where it is done), a reply is transmitted back to the merchant 102, via the acquirer 104, as indicated above, to allow the merchant 102 to continue the transaction or halt the transaction (depending on the reply).

Transaction data is generated, collected, and stored as part of the above interactions among the merchant 102, the acquirer 104, the payment network 106, the issuer 108, and the consumer 112. The transaction data represents at least a plurality of purchase transactions, for example, authorized transactions, cleared transactions, attempted transactions, etc. The transaction data, in this exemplary embodiment, is stored at least by the payment network 106 (e.g., in a data structure associated with the payment network 106 (e.g., stored in memory 204 of a computing device 200 associated with the payment network 106, etc.), etc.). Additionally, or alternatively, the merchant 102, the acquirer 104 and/or the issuer 108 may store the transaction data, or part thereof, in a data structure, or transaction data may be transmitted between parts of system 100, as used or needed (e.g., for clearing, etc.). The transaction data may include, for example, PANs, amounts of the transactions, merchant IDs, merchant category codes (MCCs), dates/times of the transactions, products purchased and related descriptions or identifiers, consumer authentication indicators, etc. It should be appreciated that more or less information related to transactions, as part of either authorization, clearing, and/or settling, may be included in transaction data and stored within the system 100, at the merchant 102, the acquirer 104, the payment network 106, and/or the issuer 108.

FIG. 3 illustrates an exemplary method 300 for use in capturing facial image data for a consumer (broadly, biometric data), to be stored at a payment network (and provisioned to a payment card), so that the facial image data may subsequently be used to authenticate the consumer in connection with a payment account transaction. The exemplary method 300 is described with reference to the system 100 as implemented, in part, in the biometric engine 118, and with additional reference to the computing device 200. However, the methods herein should not be understood to be limited to the exemplary system 100 or the exemplary computing device 200, and likewise, the systems and the computing devices herein should not be understood to be limited to the exemplary method 300. In addition, while the following description of the method 300 is provided with reference to facial image biometric data, it should be appreciated that the present disclosure is not so limited and that other forms of available biometric data may be utilized herein in similar fashion (e.g., fingerprint data, retina data, voice data, heart rate data, etc.).

In connection with method 300, the consumer 112 may decide to make use of the authentication operations described herein for various reasons (e.g., may desire to enable his/her payment account for facial authentication, etc.). For example (and without limitation), such authentication may be required by the issuer 108 in connection with providing the payment account to the consumer 112. Or, the consumer 112 may elect such authentication as an option/service for his/her existing payment account, with such option/service provided by the payment network 106 and/or the issuer 108. In any case, when the consumer 112 decides to make use of the authentication operations, he/she initially captures (or causes to be captured) a facial image of himself/herself (e.g., a selfie image, etc.), at 302. In particular in this example, the consumer 112 interacts with the biometric engine 118, through an API associated with and/or offered by the issuer 108, and takes a picture of himself/herself using a camera input device 208 (e.g., associated with his/her computing device, associated with another computing device, etc.). The consumer 112, via the computing device (e.g., via processor 202 associated therewith, etc.) and the API, then transmits the facial image (as image data) to the biometric engine 118, at 304, and the payment network 106 (as being associated with the biometric engine 118 in this example). With that said, and as described above in the system 100, it should be appreciated that the consumer 112 may capture his/her facial image (at 302) in manners other than through use of the API.

In turn, the biometric engine 118 (again, as part of the payment network 106) receives the image data associated with the consumer's captured facial image and stores the image data in a data structure associated with the biometric engine 118, at 306. The data structure may be included in memory 204 associated with the biometric engine 118, or in memory 204 associated with the payment network 106. Alternatively, the data structure may be included in other memory 204 in the system 100 (e.g., apart from the payment network 106 and/or the biometric engine 118 but in communication therewith, etc.).

Then in the method 300, the biometric engine 118 causes the image data to be provisioned to the consumer's payment card 114, at 308. In particular, for example, the issuer 108 and/or the consumer 112 may request the image data to be provisioned to the consumer's payment card 114 (e.g., as part of an application by the consumer 112 for a new payment account from the issuer 108; as part of a request by the consumer 112 to activate the authentication operations described herein as a new service for his/her payment account from the payment network 106 and/or the issuer 108, etc.). In response, the biometric engine 118 transmits the image data to the issuer 108, for example, or to a service provider (not shown) associated with at least one of the payment network 106, the issuer 108, and the payment card 114, so that the image data can be provisioned to the payment card 114 and stored locally therein (as a reference image or as reference image data). With that said, and as described above in the system 100, it should be appreciated that such an additional request by the issuer 108 and/or the consumer 112 to provision the image data to the payment card 114 is not required in all embodiments. For example, in some embodiments, once the consumer 112 transmits the image data to the biometric engine 118 (and the payment network 106), the biometric engine 118 automatically causes the image data to be provisioned to the consumer's payment card 114.

In turn, the image data is provisioned to the payment card 114 (e.g., by the issuer 108, by a service provider, etc.), as the reference image data 120 for the consumer 112, and the payment card 114 is delivered to the consumer 112 for use (or, as described above in the system 100, the consumer 112 maintains possession of the payment card 114 as the reference image data 120 is provisioned thereto). The payment card 114 is then facial authentication enabled.

FIG. 4 illustrates an exemplary method 400 for use in authenticating a consumer to a payment account, in connection with a payment account transaction by the consumer using the payment account, based on image data stored in a payment card associated with the payment account. The exemplary method 400 is again described with reference to the system 100 as implemented, in part, in the payment card 114 associated with the consumer 112 and the POS device 116 associated with merchant 102, and with additional reference to the computing device 200. However, the methods herein should not be understood to be limited to the exemplary system 100 or the exemplary computing device 200, and likewise, the systems and the computing devices herein should not be understood to be limited to the exemplary method 400. Again, while the following description of the method 400 is provided with reference to facial image biometric data, it should be appreciated that the present disclosure is not so limited and that other forms of available biometric data may be utilized herein in similar fashion (e.g., fingerprint data, retina data, voice data, heart rate data, etc.).

Once the image data 120 is provisioned to the consumer's payment card 114, for example, as described in system 100 and/or method 300, the consumer 112 may use the payment card 114 to perform a purchase transaction at the merchant 102 for a product (or for multiple products). In so doing, when the consumer 112 presents the payment card 114 to the merchant 102 in connection with purchasing a product from the merchant 102, the merchant 102, via the POS device 116, initially identifies the payment card 114 as facial authentication enabled, at 402 (e.g., based on instruction from the payment card 114, such as from an EMV chip thereon; etc.).

In response, the POS device 116 solicits a facial image of the consumer 112, at 404. For example, the POS device 116 may request that the consumer 112 capture his/her image at the POS device 116. Or, the POS device 116 may request a merchant attendant to capture a facial image of the consumer 112 (e.g., using a computing device associated with the merchant attendant and in communication with the POS device 116, etc.). In either case, the POS device 116 (or other computing device) may display an interface, which requests the image and provides a camera view section in which the consumer's face is positioned for capture. The POS device 116 then receives an input (e.g., from the consumer 112, from the merchant attendant, etc.) to capture the image of the consumer 112, at 406. And, at 408, the POS device 116 captures the image of the consumer and stores the captured image in memory 204 (e.g., in temporary memory 204 associated with the POS device 116, etc.).

FIG. 5 illustrates an example interface 500 that may be displayed to the consumer 112 at the POS device 116 or other device (e.g., in connection with operations 404-408 of method 400, etc.) for use in capturing an image of the consumer's face in association with the purchase transaction at the merchant 102. As shown, the interface 500 generally includes a camera view section 502, and a capture button 504. As such, when desired to authenticate the consumer 112 in connection with the purchase transaction, the consumer 112 and/or the merchant attendant initially work to position the consumer's face in the camera view section 502. Then, when the consumer's face is properly positioned, the consumer 112 or the merchant attendant actuate the capture button 504 to capture an image of the consumer 112 (and, specifically, the consumer's face).

With continued reference to FIG. 4, separately in the method 400, when the POS device 116 identifies the payment card 114 as facial authentication enabled, at 402, the POS device 116 also retrieves the previously stored image data 120 (e.g., the reference image for the consumer 112, etc.) from the payment card 114, at 410. This may be done in parallel to operations 404-408, or it may be done before or after such operations. Then, at 412, the POS device 116 compares the captured image with the reference image data 120. The comparison may be done via any suitable algorithm(s), for example, utilizing biometric feature extraction and template generation and comparison (e.g., where the templates represent the biometrics reduced to zeros and ones, as is generally known, etc.). The comparison may require an exact match, or the comparison may require a match within an acceptable confidence range (e.g., depending on the algorithm, etc.). In particular, for example, and as described above, principal components analysis (PCA), linear discriminant analysis (LDA), elastic bunch graph matching (EBGM), etc. may be used to compare the facial image data.

When the captured image does not match the reference image data 120 for the consumer 112 (as retrieved from the payment card 114), at 414, the transaction is terminated, at 416. In other embodiments, however, when the captured image does not match the reference image data 120 for the consumer 112 and depending on instructions from the issuer 108 of the payment account involved in the transaction, for example, the POS device 116 may instead request alternative forms of authentication from the consumer 112 (e.g., signature authentication, PIN authentication, etc.). For example, the issuer 108 may specify that if image authentication fails based on poor image quality, the POS device 116 is then to proceed with PIN authentication (and/or signature authentication).

Conversely when the captured image matches the reference image data 120 for the consumer 112 (or if the consumer 112 is authenticated in an alternative manner), at 414, the POS device 116 understands the consumer 112 to be authenticated, in general, and compiles an authorization request for the transaction, at 418, with an authentication indicator included therein (indicating that the consumer 112 has been authenticated, and potentially providing the means by which the consumer 112 has been authenticated (e.g., facial authentication, PIN authentication, etc.)). The POS device 116 also captures payment account credentials for the consumer's payment account from the payment card 114 (e.g., the PAN, the name of the consumer 112, the CVV code, the expiration date, etc.) and includes such credentials in the authorization request. The POS device 116 then transmits the authorization request to the acquirer 104, at 420, who in turn communicates the authorization request (or a form thereof) to the issuer 108 through the payment network 106, as described above in the system 100, to determine whether the payment account is in good standing and whether there is sufficient credit or funds to complete the transaction. In so doing, the payment network 106 may intercept the authorization request to confirm the presence of the authentication indicator, as also described above.

In view of the above, the systems and methods herein provide the ability for consumers to authenticate themselves to their payment accounts through use of biometric data (e.g., image data, fingerprint data, voice data, retina data, heart-rate data, other known biometric data, etc.) locally stored at payment devices associated with the consumers' payment accounts. In this manner, the consumers are able to be immediately and locally authenticated to their payment accounts, without need for network connectivity, based on biometric data for the consumers captured by POS devices and corresponding comparison thereof to the reference biometric data locally stored in the payment devices.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a transaction request by a consumer to purchase a product from the merchant; (b) soliciting a payment device from the consumer associated with a payment account to be used to fund the transaction request; (c) retrieving a reference image provisioned to the payment device by a payment network; (d) capturing an image of the consumer presenting the payment device; (e) comparing the captured image of the consumer to the reference image retrieved from the payment device; (f) submitting an authorization request, in response to the transaction request, when the captured image of the consumer matches the reference image retrieved from the payment device, whereby the consumer is authenticated to the payment device and the corresponding payment account; (g) terminating the transaction request when the captured image of the consumer does not match the reference image retrieved from the payment device; and (h) soliciting at least one of a signature from the consumer and a personal identification number (PIN) from the consumer relating to the payment account, when the captured image of the consumer does not match the reference image retrieved from the payment device.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in authenticating a consumer in connection with a payment account transaction, the method comprising:
    receiving, at a point-of-sale (POS) computing device associated with a merchant, a transaction request by a consumer to purchase a product from the merchant;
    soliciting, by the POS computing device, a payment device from the consumer associated with a payment account to be used to fund the transaction request;
    identifying, by the POS computing device, the payment device as enabled for facial authentication based on instruction from the payment device;
    in response to identifying the payment device as enabled for facial authentication, retrieving, by the POS computing device, from the payment device, a reference image in a memory of the payment device, the reference image including a facial image of the consumer associated with (i) the payment device and (ii) said payment account;
    capturing, by the POS computing device, via a camera of the POS computing device, a facial image of the consumer presenting the payment device;
    comparing, by the POS computing device, the captured facial image of the consumer to the reference image retrieved from the memory of the payment device, based on an image comparison algorithm;
    authenticating, by the POS computing device, the consumer based on the captured facial image of the consumer matching the reference image retrieved from the payment device;
    in response to authenticating the consumer based on the captured facial image:
        compiling, by the POS computing device, an authorization request for the transaction request;
        appending, by the POS computing device, an authentication indicator to a data element of the authorization request, the authentication indicator indicating that the consumer was successfully authenticated via biometric authentication; and
        submitting, by the POS computing device, the authorization request to a payment network, in response to the transaction request.

2. The computer-implemented method of claim 1, wherein the payment device includes a payment card.

3. The computer-implemented method of claim 1, further comprising appending, to the authorization request, data relating to the reference image provisioned to the payment device and data relating to the captured facial image of the consumer.

4. The computer-implemented method of claim 1, further comprising terminating the transaction request when the captured facial image of the consumer does not match the reference image retrieved from the payment device.

5. The computer-implemented method of claim 1, further comprising:
    soliciting, by the POS computing device, at least one of a signature from the consumer and a personal identification number (PIN) from the consumer relating to the payment account, when the captured facial image of the consumer does not match the reference image retrieved from the payment device; and
    submitting the authorization request, in response to the transaction request, based on the signature from the consumer and/or the PIN, whereby the consumer is still authenticated to the payment device and the corresponding payment account even though the captured facial image of the consumer does not match the reference image retrieved from the payment device.

6. The computer-implemented method of claim 1, wherein capturing the facial image of the consumer presenting the payment device includes receiving an input from the consumer in connection with capturing the facial image of the consumer.

7. The method of claim 1, wherein the POS computing device includes the camera.

8. A non-transitory computer-readable storage media including executable instructions for authenticating consumers to payment accounts in connection with payment account transactions by the consumers, which when executed by a processor, cause the processor to:
    receive a transaction request from a consumer to purchase a product from a merchant through use of a payment account;
    solicit, from the consumer, a payment device associated with the payment account to be used to fund the transaction request;
    identify the payment device as enabled for facial authentication based on instruction from the payment device;
    in response to the payment device being identified as enabled for facial authentication, retrieve, from a memory of the payment device, a reference image, the reference image including a facial image;
    capture, via a camera coupled to the processor, a facial image of the consumer in connection with the transaction request;
    compare the captured facial image of the consumer to the reference image retrieved from the memory of the payment device based on an image comparison algorithm;
    authenticate the consumer based on the captured facial image of the consumer matching the referenced image retrieved from the memory of the payment device; and
    generate and submit an authorization request to a payment network, in response to the transaction request and in response to the consumer being authenticated, the authorization request including an authentication indicator in a data element of the authorization request indicating that the consumer was successfully authenticated via biometric authentication and data relating to the reference image provisioned to the payment device in one or more other data elements of the authorization request.

9. The non-transitory computer-readable storage media of claim 8, wherein the executable instructions, when executed by the processor, further cause the processor to solicit at least one of a signature from the consumer and a personal identification number (PIN) from the consumer relating to the payment account, when the captured facial image of the consumer does not match the reference image retrieved from the payment device; and wherein the executable instructions, when executed by the processor, cause the processor, in connection with generating and submitting the authorization request, to generate and submit the authorization request, in response to the transaction request, based on the signature from the consumer and/or the PIN, whereby the consumer is still authenticated to the payment device and the corresponding payment account even though the captured facial image of the consumer does not match the reference image retrieved from the payment device.

10. The non-transitory computer-readable storage media of claim 9, wherein the executable instructions, when executed by the processor, further cause the processor to capture the facial image of the consumer, when the consumer presents the payment device in connection with the transaction request, for comparison to the retrieved reference image.

11. The non-transitory computer-readable storage media of claim 9, wherein the executable instructions, when executed by the processor, further cause the processor to receive the captured facial image of the consumer, when the consumer presents the payment device in connection with the transaction request, for comparison to the retrieved reference image.

12. The non-transitory computer-readable storage media of claim 9, wherein the facial image included in the reference image provisioned to the payment device includes a reference image of a face of the consumer associated with the payment device and the corresponding payment account, and wherein the captured facial image of the consumer includes a facial image of the consumer captured when the consumer presents the payment device in connection with the transaction request; and
    wherein the payment device includes a payment card.

13. The non-transitory computer-readable storage media of claim 12, wherein the executable instructions, when executed by the processor, cause the processor, in connection with generating and submitting the authorization request, to:
    append the authentication indicator to the authorization request; and/or
    append, to the authorization request, the data relating to the reference image provisioned to the payment card.

14. A point-of-sale (POS) device for use in authenticating a consumer to a payment account in connection with a transaction request by the consumer using the payment account, the point-of-sale (POS) device comprising:
    a processor; and
    a memory coupled to the processor, the memory comprising executable instructions that, when executed by the processor, cause the processor to:
        in response to a transaction request by a consumer at a merchant, solicit a payment device associated with a payment account to be used to fund the transaction request;
        identify the payment device as enabled for facial authentication based on instruction from the payment device;
        retrieve, from a memory of the payment device, a reference image, the reference image including a facial image;
        capture, via a camera, from the consumer in connection with the transaction request, a facial image of the consumer;
        compare the captured facial image of the consumer to the reference image retrieved from the memory of the payment device based on an image comparison algorithm;
        solicit at least one of a signature from the consumer and a personal identification number (PIN) from the consumer relating to the payment account, in response to the captured image of the consumer not matching the reference image retrieved from the payment device;
        compile an authorization request for the transaction request, and append an authentication indicator to a data element of the authorization request, the authentication indicator representative of biometric authentication being performed on the consumer and whether or not the captured image of the consumer matched the reference image retrieved from the payment device; and
    submit the authorization request to a payment network.

* * * * *